United States Patent
Muhlrad

(10) Patent No.: US 9,428,019 B1
(45) Date of Patent: Aug. 30, 2016

(54) DRIVE AND STABILIZATON SYSTEM FOR AMPHIBIOUS ROBOTIC BALL

(71) Applicant: Guardbot Inc., Stamford, CT (US)

(72) Inventor: Peter Muhlrad, Old Greenwich, CT (US)

(73) Assignee: GUARDBOT INC., Stamford, CT (US)

( * ) Notice: Subject to any disclaimer, the term of this patent is extended or adjusted under 35 U.S.C. 154(b) by 0 days.

(21) Appl. No.: 14/326,688

(22) Filed: Jul. 9, 2014

Related U.S. Application Data

(60) Provisional application No. 61/844,392, filed on Jul. 9, 2013.

(51) Int. Cl.
| | |
|---|---|
| *B62D 57/00* | (2006.01) |
| *B60F 3/00* | (2006.01) |
| *B60K 7/00* | (2006.01) |
| *B62D 61/00* | (2006.01) |

(52) U.S. Cl.
CPC ..... *B60F 3/0007* (2013.01); *B60K 2007/0038* (2013.01); *B62D 57/00* (2013.01); *B62D 61/00* (2013.01)

(58) Field of Classification Search
CPC .................. B62D 57/00; B62D 61/00; B60K 2007/0038

USPC .............................................. 180/7.1, 10, 21
See application file for complete search history.

(56) References Cited

U.S. PATENT DOCUMENTS

| | | | | |
|---|---|---|---|---|
| 3,798,835 | A * | 3/1974 | McKeehan | 446/442 |
| 6,227,933 | B1 * | 5/2001 | Michaud et al. | 446/462 |
| 7,726,422 | B2 * | 6/2010 | Sun et al. | 180/7.1 |
| 8,099,189 | B2 * | 1/2012 | Kaznov | A63H 11/00 318/568.12 |
| 2008/0097644 | A1 * | 4/2008 | Kaznov et al. | 700/245 |
| 2010/0122859 | A1 * | 5/2010 | Schroll | 180/54.1 |

* cited by examiner

*Primary Examiner* — Anne Marie Boehler
*Assistant Examiner* — Marlon A Arce
(74) *Attorney, Agent, or Firm* — John S. Economou

(57) ABSTRACT

A ball robot formed from a spherical shell includes a main axle, first and second pendulums pivotally coupled to the main axle, and a drive mechanism for the first and the second pendulums. The drive mechanism drives the first and second pendulums together in a first rotational direction to move the ball robot forward and backward and in opposing directions to cause the ball robot to turn right or left. In an alternative embodiment, a flywheel is used to provide forward and backward movement and a pendulums is used to cause the ball robot to turn right or left.

1 Claim, 4 Drawing Sheets

DRIVE AND STABILIZATON SYSTEM FOR AMPHIBIOUS ROBOTIC BALL

FIELD

This disclosure relates generally to a system for propelling and steering a robotic ball.

BACKGROUND

A conventional rugged amphibious robotic ball 10 is shown in FIG. 1 which can carry a range of payloads. The ball 10 shown in FIG. 1 includes a shell 20 and operates by actuating a pendulum 70 about two independent axes. Movement of the pendulum 70 about the axis 40 propels the ball 10 to roll forward by moving the center of mass of the ball 10 in front of a contact patch with the ground. All or part of the hanging mass can rotate about the main axle 40, and all or part may rotate about an orthogonal axle 100. These two independent degrees of freedom control the forward motion and the steering angle of the ball, respectively. As the center of mass of the system shifts relative to the contact patch, the ball 10 rolls to compensate forming a rolling motion or performing a steering movement. This system requires a complicated system 120 for propulsion and steering which includes, inter alia, a primary motor 50, a secondary motor 90 and a transmission arrangement 110. In particular, with the conventional design, the two degrees of freedom are implemented in orthogonal axes making the packaging of such a system difficult and requires a large portion of the volume of the sphere to be hollow space that allows for complete movement of the pendulum in both axes.

Accordingly, there is a need for a less complicated system for propulsion and steering.

SUMMARY

In one aspect, a ball robot formed from a spherical shell. The ball robot includes, within the spherical shell, a main axle, first and second pendulums, and a drive mechanism. Each of the first and second pendulums are pivotally coupled to the main axle. The drive mechanism drives the pendulums and includes at least a first drive motor and a second drive motor. The drive motors are configured to drive the first and second pendulums together in a first rotational direction to move the ball robot in a first direction, to drive the first and second pendulums together in a second rotational direction to move the ball robot in a second direction opposite the first direction, and to drive the first and second pendulums in first opposing directions to cause the ball robot to turn towards a third direction, the third direction perpendicular from the first and second directions. In a further embodiment, the drive motors are also configured to drive the first and second pendulums in second opposing directions, opposite the first opposing directions, to cause the ball robot to turn in a fourth direction, the fourth direction opposite from the third direction.

In another aspect, a ball robot formed from a a spherical shell. The ball robot includes a spherical shell, a main axle within the spherical shell, a flywheel and associated flywheel drive motor, and a pendulum and an associated drive mechanism. The flywheel drive motor is configured to rotate the flywheel in a first direction to cause the ball robot to move in the first direction and to rotate the flywheel in a second direction opposite the first direction to cause the ball robot to move in the second direction. The pendulum is pivotally coupled to the main axle. The drive mechanism for driving the pendulum has at least a drive motor configured to move the pendulum in a third direction perpendicular from the first and second directions to cause the ball robot to turn towards the third direction, and to move the pendulum in a fourth direction opposite the third direction to cause the ball robot to turn towards the fourth direction.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
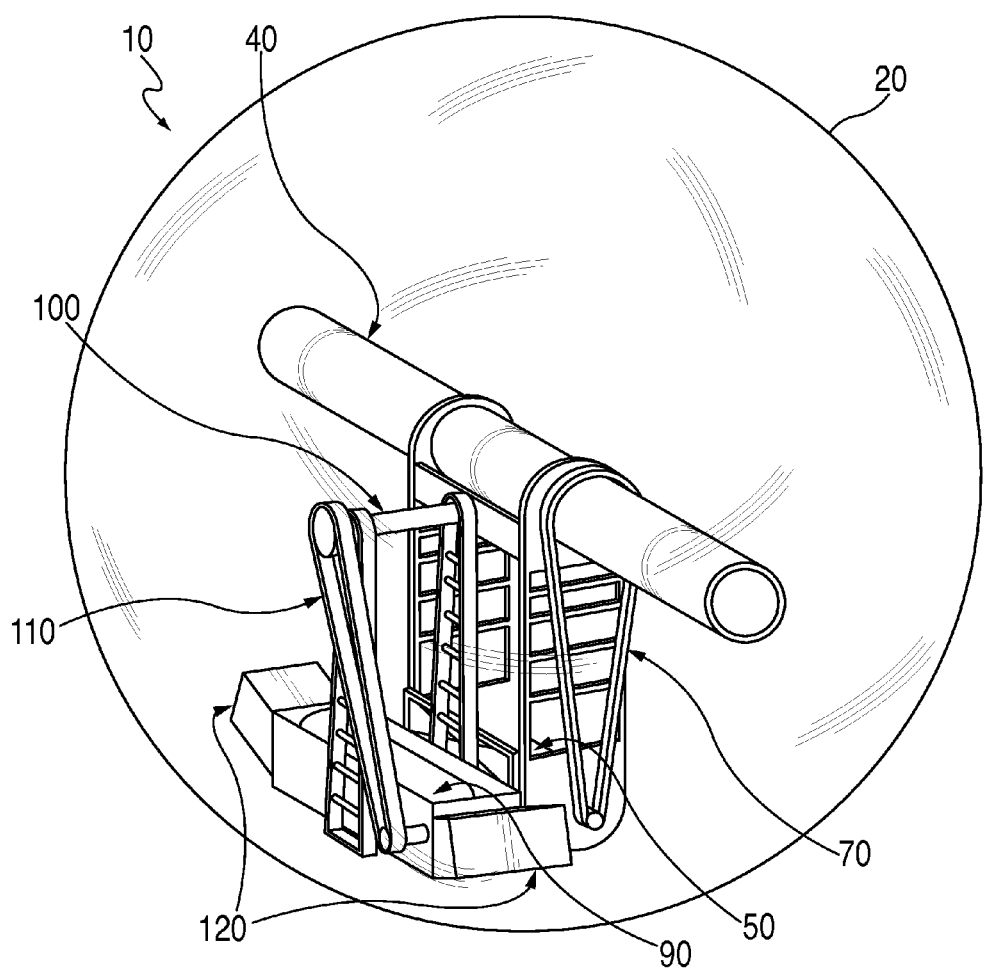
FIG. 1 is a block diagram showing a prior art system for propelling and steering a robotic ball.
Figure 2:
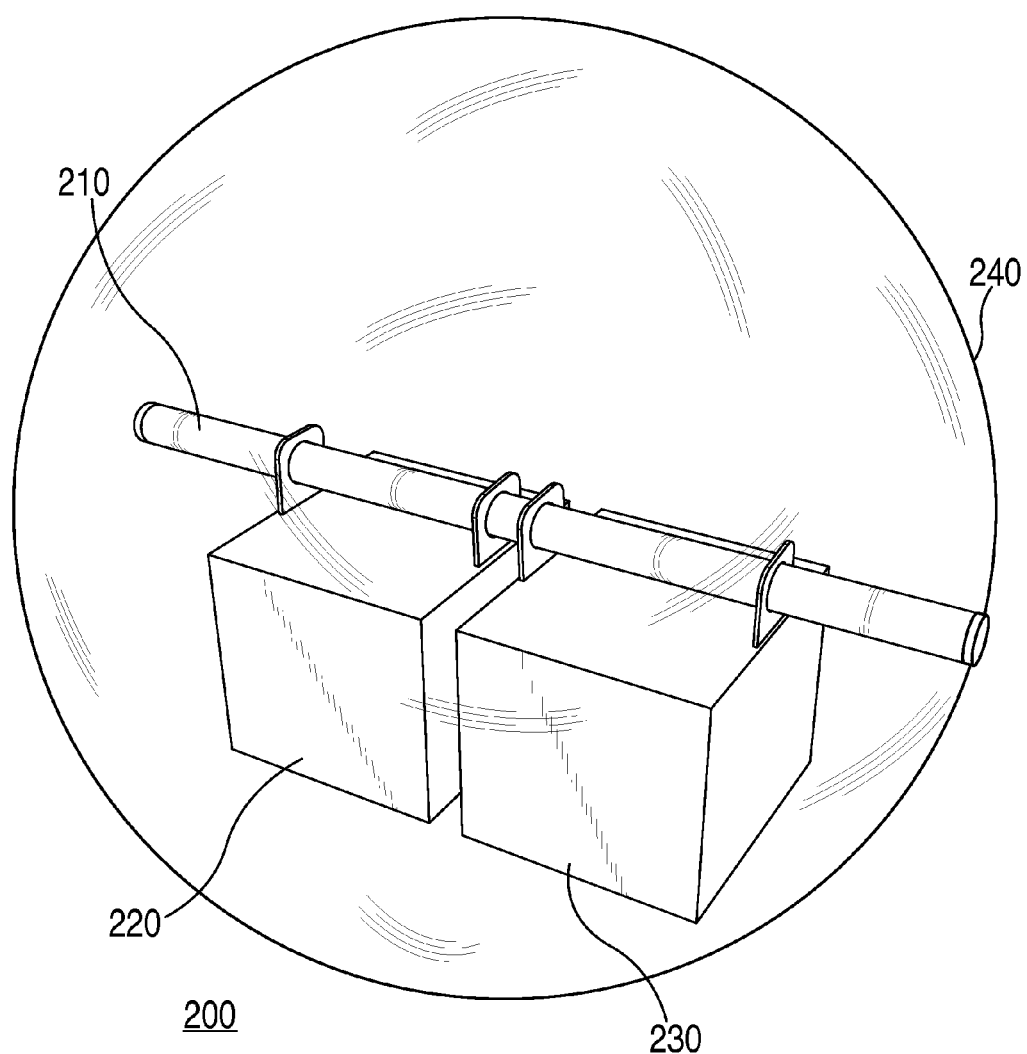
FIG. 2 is a block diagram of a system for propelling and steering a robotic ball in a first position of a first embodiment according to the present disclosure.

From a physics perspective, driving a spherical robot along a surface relates to controlling the location of the center of mass of the sphere relative to a contact patch of the sphere with the surface. As such, instead of two orthogonal pendulum axes (traction and roll) as used in the conventional spherical robot mentioned in the Background section herein, the preferred embodiment shown in FIG. 2 includes two or more coaxial or parallel axis pendulums—a right pendulum mass 230 and a left pendulum mass 220 which are each coupled to a main axle 210. When both masses 220, 230 are driven forward in tandem (via a motor mechanism not shown), the ball 200 will accelerate straight ahead. In this mode, the center of mass of ball 200 is ahead of the contact patch in exactly the same way as the conventional implementation. In addition and also like the conventional implementation, when both masses 220, 230 are returned to a neutral position, the ball 200 will continue to roll straight.

Figure 3:
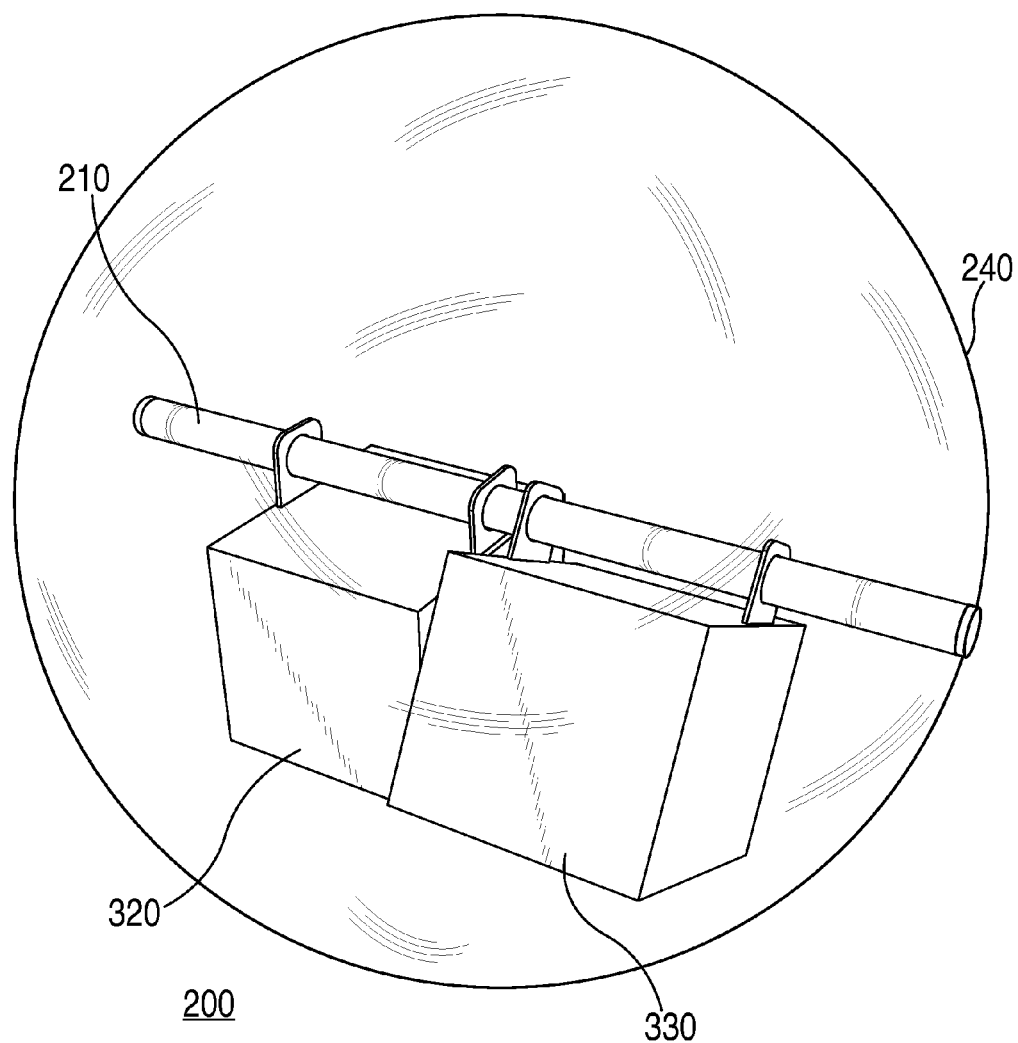
FIG. 3 is a block diagram of a system for propelling and steering a robotic ball in a second position of the first embodiment according to the present disclosure.

Steering of the ball 200 may be achieved by the opposing motion of the two pendulum masses 220, 230 (i.e., driving one mass forward and the other mass backwards). In particular, FIG. 3 depicts a robot ball 200 initiating a turn, with one pendulum mass 330 moved forward and a separated from the other pendulum mass 320 moved backward. This mode of turning differs significantly from the conventional system. To initiate a turn under the system disclosed herein, one mass (e.g., mass 330 in FIG. 3) is advanced forward as the second mass (e.g., mass 320) is moved backwards. The turn is completed when the movement of both masses is stopped (i.e., when both masses are returned to a neutral position). The dynamic as well as static behavior of the pendulums 320, 330 may be handled either remotely (e.g., wirelessly) or internally by a wire bus connecting the driving mechanism for the two masses 320, 330. In normal operation, neither mass 320, 330 makes a complete revolution relative to the other, so the two may be directly connected together.

In the present disclosure, because the drive system is less complicated, a larger portion of the internal space of the sphere can be utilized and the robustness of the system can be improved. Although not necessary, the two pendulum systems may be identical to reduce system complexity and thus provide a less costly implementation than the conventional system since there are less parts required. Although the control of robot 200 is slightly more counter-intuitive, a simple strategy can be implemented in software to drive the robot with the same type of commands as the current state of the art spherical robot propulsion methods.

Figure 4:
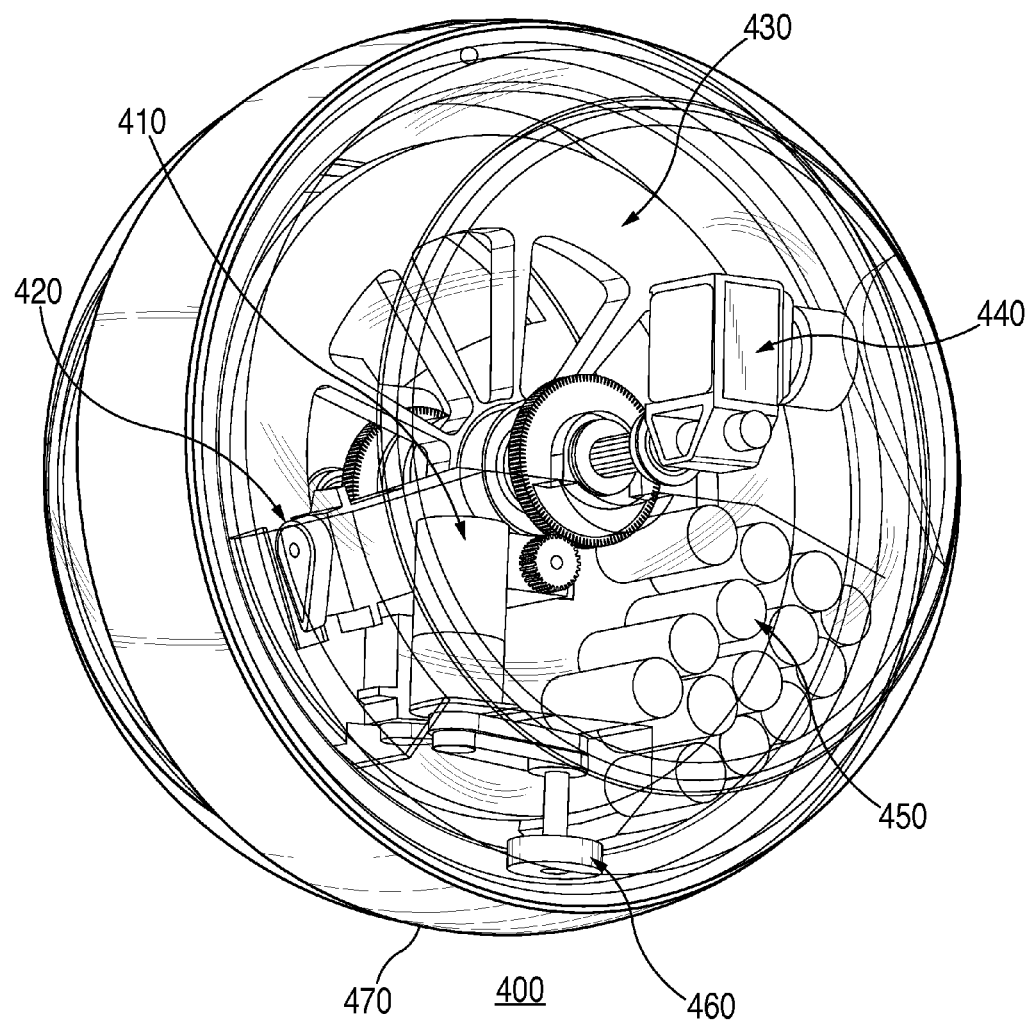
FIG. 4 is a block diagram showing a second embodiment of a system for propelling and steering a robotic ball according to the present disclosure.

FIG. 4 shows another unique propulsion and stabilization system in a ball 400 which uses a flywheel 430 driven by a drive motor 410 within a housing 470. A battery module 450 is provided to power drive motor 410. As one of ordinary skill in the art will readily recognize, a flywheel may be used to provide stabilization and as an energy storage device. In the second embodiment shown in FIG. 4, a flywheel 430 is used for propulsion and stabilization of a spherical robot 400. In the illustrated embodiment, flywheel 430 acts as a gyroscope within the spherical robot 400 to keep the system oriented perfectly vertical while rolling. As in the first embodiment, steering is achieved through movement of the center of mass of the ball to the left or right. In the conventional system, this would result in the ball tilting to the left or right as it rolls and thus make the ball roll in an arc. However, in the second embodiment, if the center of mass is moved to the left or right (by moving a pendulum not shown in a similar manner as the first embodiment, or through a translation of the entire flywheel system to one side or another inside of the ball), the ball 400 stays perfectly level (due to gyroscopic action of the flywheel 430) and only rotates about the contact point on the ground. Steering thus requires no forward movement and can be achieved without tilting the ball.

In addition to the added benefits of stabilization, flywheel 430 also may aid propulsion. A brake or clutch 420 (attached to a mass not shown) may be coupled to the outer shell 470 using a drive wheel 460 and may be used to selectively oppose the rotation of the flywheel. As the rotational energy is extracted from flywheel 430 into the shell 470, the ball 400 is thus propelled forward. This feature is extremely useful because it enables high energy maneuvers such as "jumping" out of an obstacle. The key advantage of using the flywheel system is the addition of high energy maneuvers through extracting movement from the flywheel and using the flywheel as a stabilizing feature.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A ball robot, comprising:
   a spherical shell;
   a main axle within the spherical shell;
   a flywheel and associated flywheel drive motor within the spherical shell, the flywheel drive motor configured to rotate the flywheel in a first direction to cause the ball robot to move forward and to rotate the flywheel in a second direction opposite the first direction to cause the ball robot to move backward;
   a pendulum pivotally coupled to the main axle; and
   a drive mechanism for driving the pendulum comprising a drive motor configured to move the pendulum in a third direction perpendicular from the first and second directions to cause the ball robot to turn towards the third direction, and to move the pendulum in a fourth direction opposite the third direction to cause the ball robot to turn towards the fourth direction.

\* \* \* \* \*